(12) United States Patent
Castiglioni et al.

(10) Patent No.: US 10,464,397 B2
(45) Date of Patent: Nov. 5, 2019

(54) THERMAL SYSTEM WITH HIGH ASPECT RATIO VENT

(71) Applicant: Tesla, Inc., Palo Alto, CA (US)

(72) Inventors: Giacomo Castiglioni, El Granada, CA (US); Raffaele N Russo, Sunnyvale, CA (US); Joseph Mardall, San Francisco, CA (US); Nicholas Mancini, San Jose, CA (US)

(73) Assignee: Tesla, Inc., Palo Alto, CA (US)

( * ) Notice: Subject to any disclaimer, the term of this patent is extended or adjusted under 35 U.S.C. 154(b) by 173 days.

(21) Appl. No.: 15/060,590

(22) Filed: Mar. 3, 2016

(65) Prior Publication Data

US 2017/0253107 A1    Sep. 7, 2017

(51) Int. Cl.
*B60H 1/34* (2006.01)
*B60H 1/24* (2006.01)
*B60H 1/00* (2006.01)

(52) U.S. Cl.
CPC ....... *B60H 1/3414* (2013.01); *B60H 1/00564* (2013.01); *B60H 1/00828* (2013.01); *B60H 1/00835* (2013.01); *B60H 1/00871* (2013.01); *B60H 1/00985* (2013.01); *B60H 1/242* (2013.01); *B60H 1/247* (2013.01); *B60H 1/3407* (2013.01)

(58) Field of Classification Search
CPC .................. B60H 1/24; B60H 1/0021; B60H 2001/00185; B60H 1/00457; B60H 1/00485; B60H 1/005057; B60H 1/00564; B60H 1/26; B60H 1/3407; B60H 1/3414; B60H 1/3421; B60H 1/3428; B60H 1/3435; B60H 1/3442; F24F 13/072; F24F 13/06; F60H 1/34

USPC .......................................... 454/143, 152, 155
See application file for complete search history.

(56) References Cited

U.S. PATENT DOCUMENTS

| | | | |
|---|---|---|---|
| 5,599,229 A * | 2/1997 | Claunch | D21F 5/18 34/492 |
| 5,735,338 A * | 4/1998 | Chevroulet | B60H 1/0005 165/42 |
| 6,644,559 B2 * | 11/2003 | Kondo | B60H 1/00064 237/12.3 B |
| 7,455,581 B2 | 11/2008 | Gehring et al. | |

(Continued)

FOREIGN PATENT DOCUMENTS

EP    1657506 A1    5/2016
FR    2844484 A1    3/2004

OTHER PUBLICATIONS

International Searching Authority; International Search Report and Written Opinion; International Application No. PCT/US2017/019123; dated May 16, 2017; 8 pgs.

*Primary Examiner* — Steven B McAllister
*Assistant Examiner* — Ko-Wei Lin
(74) *Attorney, Agent, or Firm* — Knobbe Martens Olson & Bear LLP

(57) ABSTRACT

A thermal system with high aspect ratio vents for a vehicle. The thermal system comprises: at least one HVAC unit; a first vent with a first high aspect ratio, the first vent coupled to the HVAC unit and configured to generate a first plane of air in a passenger compartment of the vehicle; and a second vent coupled to the HVAC unit and configured to generate a second plane of air in the passenger compartment, the second vent positioned so that the second plane of air intersects the first plane of air.

16 Claims, 12 Drawing Sheets

(56) References Cited

U.S. PATENT DOCUMENTS

| | | |
|---|---|---|
| D672,307 S | 12/2012 | von Holzhausen et al. |
| 2004/0127153 A1 | 7/2004 | Demerath |
| 2007/0293134 A1* | 12/2007 | Shimada ............... B60H 1/3407 |
| | | 454/121 |
| 2008/0182498 A1 | 7/2008 | Vejalla |
| 2009/0117841 A1* | 5/2009 | Goto .................. B60H 1/00064 |
| | | 454/127 |
| 2011/0296855 A1 | 12/2011 | Johnston et al. |
| 2012/0168125 A1 | 7/2012 | Johnston et al. |
| 2013/0078900 A1 | 3/2013 | Zalan |
| 2013/0344791 A1* | 12/2013 | Wang ................. B60H 1/00742 |
| | | 454/155 |
| 2014/0357179 A1 | 12/2014 | Londiche et al. |
| 2015/0099444 A1* | 4/2015 | Le ........................... B64D 13/06 |
| | | 454/76 |
| 2015/0353052 A1* | 12/2015 | Salinas ................... B60S 1/023 |
| | | 454/127 |
| 2016/0361978 A1 | 12/2016 | Groschopf |

\* cited by examiner

THERMAL SYSTEM WITH HIGH ASPECT RATIO VENT

BACKGROUND

Air supply for the benefit of a person is used in a variety of contexts. One such area is the passenger compartment of a vehicle, where air is typically introduced through one or more vents. For example, such vents can be positioned in the instrument panel for use primarily by the front seat occupants, and sometimes also in a second (or higher) row of seats for other passengers as well. The vents are usually controlled to regulate the flow of air entering the cabin, and the direction thereof. The vents are connected to the vehicle's heating, ventilation and air conditioning (HVAC) system so that hotter, colder and/or dehumidified air can be supplied as desired.

Traditional automotive vents have a low aspect ratio, meaning that their width is relatively similar to their height. For example, circular or rectangular vents are common. These vents are generally positioned flush with the surface of the instrument panel. However, these point-like outlets are not optimized for distributing the air over a wider area, which necessitates the use of multiple vents for each passenger. Also, the appearance of the vents may be unsightly and can disrupt an otherwise uniform design of the instrument panel or other interior surface.

SUMMARY

In a first aspect, a thermal system with high aspect ratio vents for a vehicle. The thermal system comprises: at least one HVAC unit; a first vent with a first high aspect ratio, the first vent coupled to the HVAC unit and configured to generate a first plane of air in a passenger compartment of the vehicle; and a second vent coupled to the HVAC unit and configured to generate a second plane of air in the passenger compartment, the second vent positioned so that the second plane of air intersects the first plane of air.

Implementations can include any or all of the following features. The second vent has a second high aspect ratio and wherein the first high aspect ratio is different from the second high aspect ratio. The second vent includes multiple vent outlets, and wherein each of the vent outlets is shorter than the first vent. The thermal system further comprises a common duct supplying air from the HVAC unit, a first duct leading from the common duct to the first vent, a second duct leading from the common duct to the second vent, and a valve in the second duct. The thermal system further comprises a curved duct leading to the first vent, and a vane positioned in the curved duct away from a line of sight entering the curved duct from the passenger compartment. The thermal system further comprises a duct leading to the first vent, and a step inside the duct that faces toward the passenger compartment. The thermal system further comprises one or more ribs partially covering an opening of the second vent. The first and second vents are positioned in an instrument panel of the vehicle. The instrument panel comprises a first structure on a long side of the first vent, and a second structure on an opposite side of the long side, wherein an angle between the first structure and the first plane of air is greater than an angle between the second structure and the first plane of air, and wherein the second vent is positioned in the second structure. The first plane of air forms a reduced air pressure zone at the second structure, and wherein the second vent is positioned so that the second plane of air feeds into the reduced air pressure zone. The second vent is positioned so that the second plane of air pushes the first plane of air away from the second structure. The first vent and the second vent have no adjustment mechanisms visible on the instrument panel. Respective openings for the first vent and the second vent are essentially parallel to each other. The first vent is mounted above the second vent.

In a second aspect, a thermal system for a vehicle comprises: at least one HVAC unit; first means coupled to the HVAC unit for generating a first plane of air with a first high aspect ratio in a passenger compartment of the vehicle; and second means coupled to the HVAC unit for generating a second plane of air with a second high aspect ratio in the passenger compartment, wherein the second plane of air intersects the first plane of air.

Implementations can include any or all of the following features. The first means is a first vent and the second means is a second vent, the first vent mounted above the second vent in an instrument panel of the vehicle. The second vent includes multiple vent outlets, and wherein each of the vent outlets is shorter than the first vent. The first vent is oriented so that the first plane of air is essentially horizontal, and wherein the second vent is oriented upward so that the second plane of air intersects the first plane of air.

In a third aspect, a method comprises: providing a supply of air using an HVAC unit of a vehicle; generating a first plane of air into a passenger compartment of the vehicle from the supply of air, the first plane of air having a first high aspect ratio; and generating a second plane of air into the passenger compartment from the supply of air, the second plane of air having a second high aspect ratio, wherein the second plane of air intersects the first plane of air.

Implementations can include the following feature. The method further comprises controlling a direction of the first plane of air in the passenger compartment by regulating a flow of air of the second plane of air.

DETAILED DESCRIPTION

Figure 1:
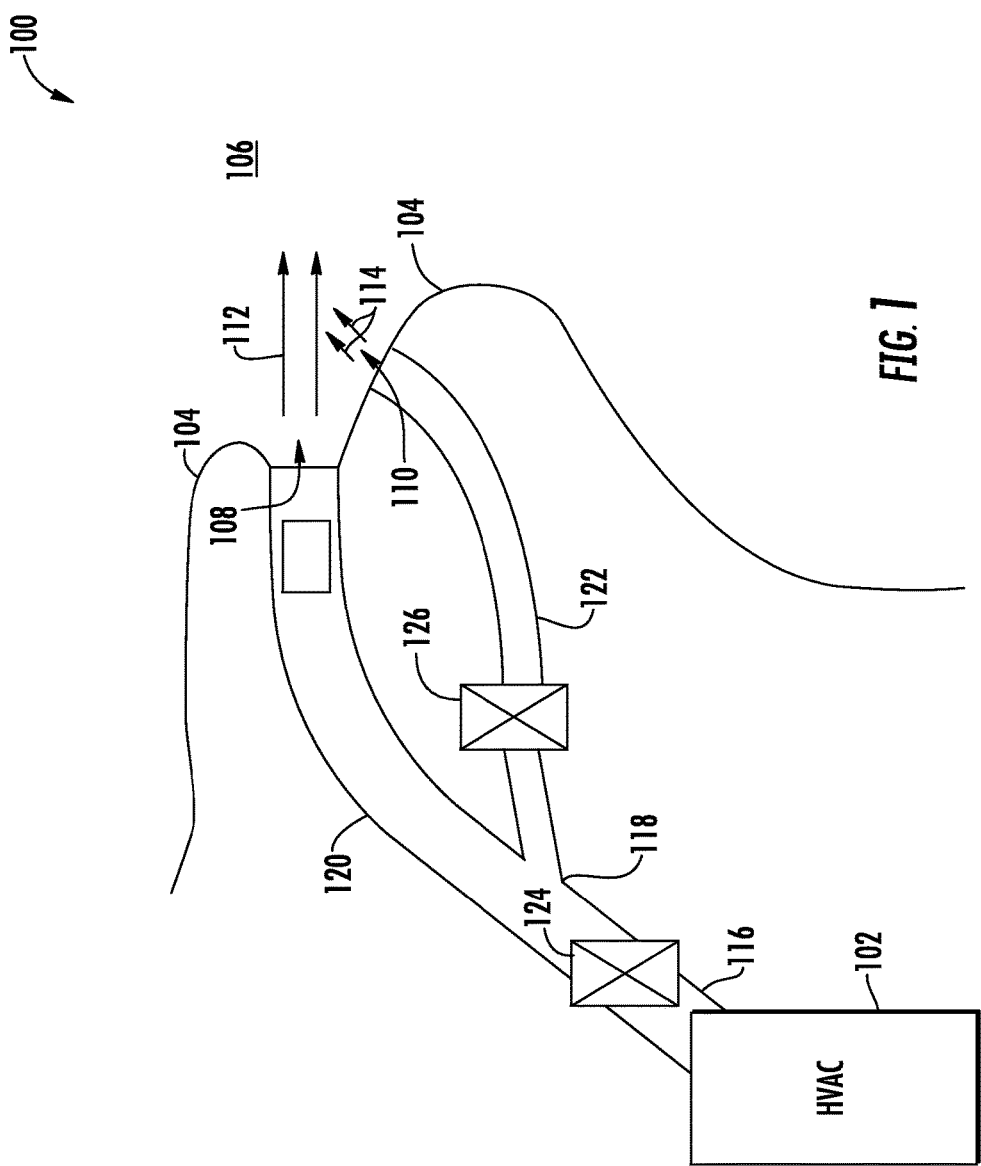
FIG. 1 shows a cross section of an example of a thermal system.

This document describes examples of systems and techniques for providing a supply of air to condition an occupant space. In some implementations, a system is provided that allows a vent to have a high aspect ratio. The system can provide good control of the vertical position of the planar jet of air also when the vent is mounted in a non-flush position with regard to an instrument panel or other structure. This can be accomplished by a secondary outlet downstream of the main vent. For example, the secondary outlet can control the main air jet by feeding a low pressure zone that would otherwise keep the main jet attached to the instrument panel. As another example, the secondary outlet can push the main jet away from the structure, thereby adding momentum to it, in analogy with free air jets colliding.

Some examples herein refer to a passenger vehicle for illustration, such vehicle having a front seat with an instrument panel positioned in front of either or both of the first row occupants. Other implementations, however, can be used with vehicles that are not conventional passenger vehicles, or can be used elsewhere in the vehicle than in a first row, such as in a second or higher row of seats.

Examples are mentioned herein where a vent generates a plane of air into the passenger compartment. Planes of air can be generated by vents that have high aspect ratios, such as a large width and a narrow height. Vents with high aspect ratios generate air streams that have special fluid dynamic behavior. In general, the core of a fluid jet can be regarded as two dimensional when the aspect ratio of the jet is above eight. That is, if the vent is more than eight times wider than it is tall, then the air stream produced by the vent can be considered as a two-dimensional surface in certain regards.

The two-dimensional air jet can behave in particular ways relative to nearby structure, some of which may not be desirable. This can occur when the vent is not mounted flush with the instrument panel, but rather the instrument panel has structure extending forward from the vent alongside the generated jet. If the angle between the jet and such structure is less than a particular value (e.g., on the order of 64 degrees) the jet can tend to bend from influence of the structure and travel along the surface thereof. This is sometimes referred to as the stream sticking to the surface, with the understanding that air continues to flow inside the stream but that the stream as a whole has been diverted in another (here undesirable) direction. Generally, such a plane of air gives rise to a region where the air has a lower pressure than in the immediately surrounding areas. That is, the aspect ratio of the air stream influences the angle at which the jet would begin sticking to nearby structure. The term Coanda effect is sometimes used for this phenomenon.

Moreover, this effect is aggravated if the structure of the instrument panel that encloses the non-flush vent is not symmetrical on both sides of the vent. Consider an example where instrument panel structure extends forward along the jet stream on one side thereof (e.g., below the vent) but on the other side (e.g., above the vent) the structure does not extend forward to the same degree, or not at all. This can reduce the angle at which the jet stream tends to stick to the instrument panel. As such, non-symmetric surrounding structures can complicate the control of an air stream from a non-flush air vent.

As a particular example, if the vent in an instrument panel were to generate a plane of air, but the location of the vent (e.g., in a non-flush position) caused such unwanted sticking of the air stream, the air stream could end up aimed at only one area inside the cabin (e.g., toward the occupants' legs) with little or no opportunity to control its direction. If the orientation of the non-flush vent were changed to overcome this problem, such as by aiming the vent further upward and away from the interfering surface, then the jet can end up aimed essentially toward the ceiling of the vehicle and may therefore still miss the intended target zone. Such an approach can result in a vent that at best has a binary behavior and does not provide adequate passenger comfort.

Based on the foregoing, the present description exemplifies thermal systems with one or more main vents that have high aspect ratios. For each main vent, there is at least one other, secondary vent oriented so that the plane of air it generates will intersect the plane of air from the high aspect ratio vent. As used herein, a high aspect ratio refers to a relationship where one dimension of the thing (e.g., the width of a vent) is more than eight times greater than a different dimension thereof (e.g., the height of the vent). For example, a vent has a high aspect ratio when it is capable of producing an air stream that can practically be regarded as a two-dimensional surface for purposes of analyzing its fluid dynamic behavior.

That is, if the main vent had a greater angle (such as above 60 degrees) relative to the instrument panel, or if the aspect ratio were less (such as below six), the sticking problem could be reduced or eliminated. However, with high aspect ratios and shallow angles it becomes challenging to control the direction of the air flow. Therefore, the systems and techniques described herein provide control of such a jet also when the angle between the outlet and a nearby structure (e.g., the instrument panel) is relatively shallow, such as less than 30 degrees.

The secondary vent can, but does not necessarily, have a high aspect ratio. The secondary vent should cover essentially the entire width of the main vent and be relatively narrow so that the outlet area remains small. This can be accomplished by either a single secondary vent that has a high aspect ratio, or by a series of vents spaced across essentially the entire width such that the secondary vent effectively has a high aspect ratio.

FIG. 1 shows a cross section of an example of a thermal system 100. The system can be installed in any type of vehicle, such as in a passenger vehicle. For example, the system can be located toward the front of the vehicle. Here, the system includes an HVAC unit 102. Different types of HVAC units can be used in various implementations. For example, the operation of the HVAC unit is regulated using one or more controls (not shown) so as to selectively provide heating, ventilation and/or air conditioning to vehicle occupants.

An instrument panel 104 is here provided in the vehicle, the panel facing a passenger compartment 106. For example, the passenger compartment has seats (e.g., one or more chairs and/or benches) that accommodate occupants. The instrument panel can provide vent openings for the purpose of conditioning the air in the passenger compartment.

Here, a first vent 108 and a second vent 110 are provided through the instrument panel. In this example, the vent 108 is regarded as the one that produces a main air stream, in the form of a plane of air 112, and is therefore sometimes referred to as the wave vent. The vent 110, on the other hand, is here regarded as the one that produces a secondary air stream, in form of a plane of air 114, and is therefore sometimes referred to as the bleed vent. In this example, the wave vent is oriented essentially in a horizontal direction (e.g., being horizontal or a few degrees above or below horizontal) and the bleed vent is oriented in an upward direction such that the second plane of air intersects the first plane of air.

The supply of air from one or more HVAC units (e.g., the unit 102) to the respective vents can be facilitated in any of a number of ways. In some implementations, a common duct 116 originates at the HVAC unit and has one or more branch points 118. For example, the branch point can create a wave duct 120 and a bleed duct 122. The wave duct can lead to the wave vent 108, and the bleed duct can lead to the bleed vent 110.

The flow rate can be controlled in one or more ways. In some implementations, a valve 124 can be positioned in the common duct 116, or in the HVAC unit. For example, this can regulate the overall air flow that is available to be split between the wave duct and the bleed duct. In some implementations, a valve 126 can be positioned in the bleed duct 122. This can be used to control the amount of flow through the bleed vent. Combinations of these approaches can be used. That is, the present example illustrates the common duct 116 supplying air from the HVAC unit 102 into the duct 120 leading to the wave vent 108, and into the bleed duct 122 leading to the bleed vent 110.

The amounts of air flow through the respective ducts can be set to a variety of levels relative to each other depending on the particular implementation and the situation in which the system is being used. In some implementations, the flow through the bleed vent can be regulated to control the relative position and direction of the air stream generated by the wave vent. For example, increasing the flow through the bleed vent can raise the wave air stream, and decreasing the flow can lower the air stream.

That is, the foregoing illustrates an example of the thermal system 100 having the vents 108 and 110. The vent 108 has a high aspect ratio and is coupled to the HVAC unit 102 so as to generate the plane of air 112 in the passenger compartment 106. The vent 110 also has high aspect ratio and is coupled to the HVAC unit 102 to generate the plane of air 114 in the passenger compartment 106. Finally, the vent 110 is positioned so that the plane of air 114 intersects the plane of air 112.

The foregoing also illustrates an example of a method that can be performed in a vehicle. Such a method can include providing a supply of air using the HVAC unit 102. The method can include generating the plane of air 112 into the passenger compartment 106 from the supply of air, wherein the plane of air 112 has a high aspect ratio. The method can also include generating the plane of air 114 into the passenger compartment 106 from the supply of air. The plane of air 114 intersects the plane of air 112.

Figure 2:
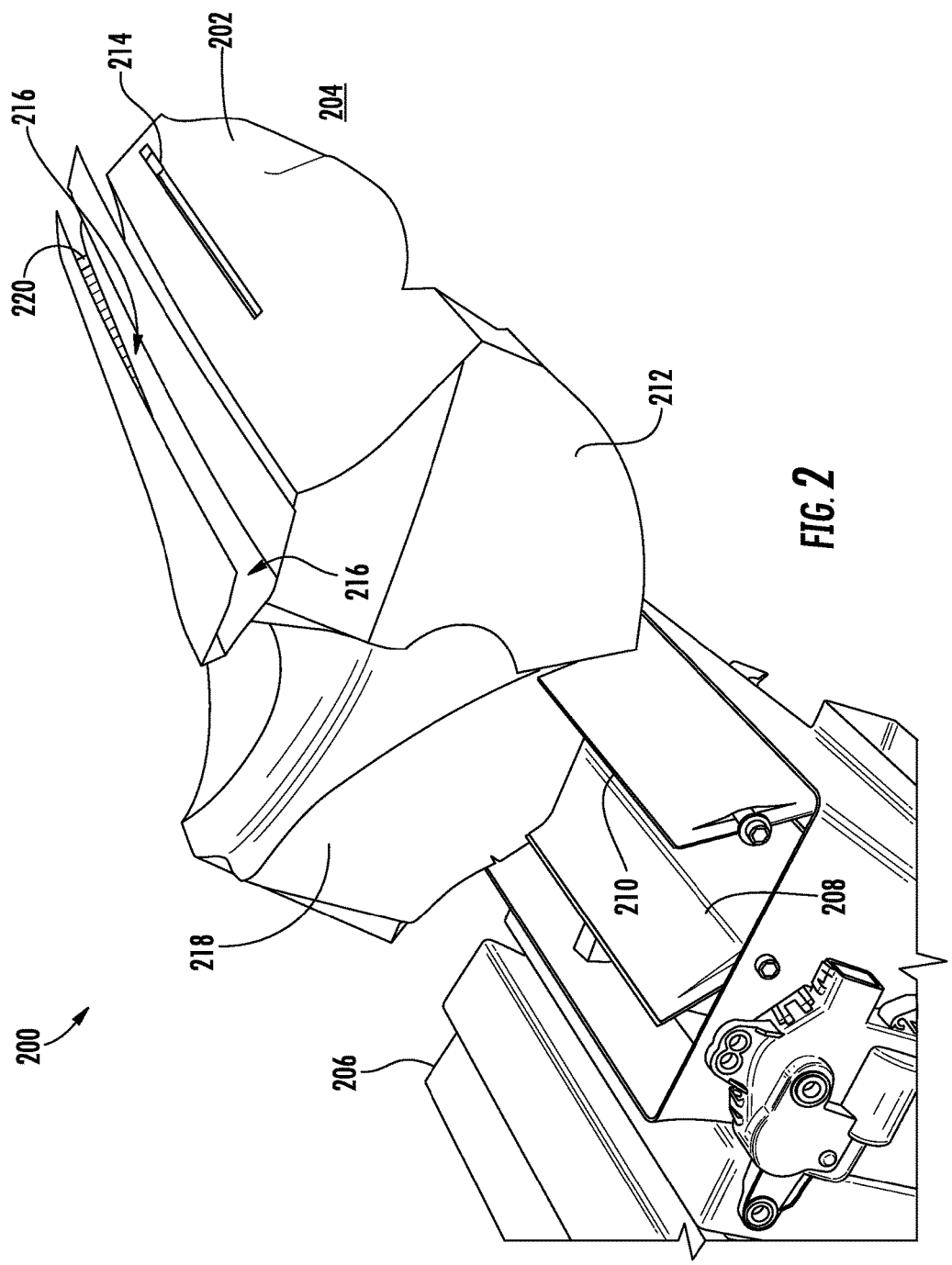
FIG. 2 shows a cross section of another example of a thermal system.

FIG. 2 shows a cross section of another example of a thermal system 200. Some components of the system 100 (FIG. 1) can also be used in the system 200 and these components will not be described in detail. Here, an instrument panel 202 is partially shown, the instrument panel facing toward the interior of the cabin of a vehicle 204. An HVAC unit 206 is partially shown. For example, the HVAC unit is configured for receiving air through one or more inlets and conditioning the air in one or more ways before introducing it into the cabin. A panel door 208 regulates air flow from the HVAC unit to the instrument panel. For example, the door can include a flat member that is controlled to pivot relative to an outlet of the HVAC unit to regulate the air supply therefrom. A bleed door 210 regulates the amount of air flow into a bleed duct 212 which in turn leads to a bleed outlet 214. For example, the bleed door can be pivoted relative to the bleed duct and the outlet of the HVAC unit so as to allow varying amounts of air flow into that duct.

A wave outlet 216 is here partially shown. The wave outlet can provide the main air stream from the instrument panel toward the occupant(s), and can be fed through a wave duct 218 coupled to the HVAC unit. The wave outlet and the bleed outlet can both have high aspect ratios. For example, this can allow the wave outlet to be positioned as a non-flush vent that generates a first plane of air into the passenger compartment, and the bleed outlet can act as a secondary vent generating a second plane of air that intersects the first plane.

The ducts leading to either of the vents, or both, can have one or more vanes to control a direction of the air flow. Here, the wave outlet 216 has a guide vane 220. In this example, the wave vent is positioned above the bleed vent on the instrument panel 202. For example, the guide vane 220 controls the left-right direction, whereas the bleed vent can regulate the up-down direction, of the air jet from the wave outlet. The user can change these settings (e.g., left-right or up-down directions) using one or more virtual controls presented on a touchscreen in the vehicle. A user input made using such control(s) can then trigger a control signal that changes the orientation of the vanes (for left-right direction) and/or a control signal that changes the amount of flow through the bleed outlet 214 (for up-down direction).

The wave outlet 216 and the bleed outlet 214 here each has a high aspect ratio. While the entire wave outlet is not visible due to the section (which is done for illustrative purposes), the figure shows that the respective vents are essentially parallel to each other, and that the wave vent is longer than the bleed vent. In some implementations, the problem of a planar air stream from a non-flush vent sticking to the instrument panel can be satisfactorily addressed also when the secondary vent (that here generates the bleed air stream) is shorter than the main vent. In some implementations, multiple bleed vents can be used with one wave vent, or vice versa. In other implementations, the vents can have approximately the same size as each other. For example, the bleed outlet cannot be more than about 30% narrower than the wave outlet.

This figure illustrates an example of a benefit that can be obtained using high aspect ratio vents: that an instrument panel (or other surface inside the cabin) can be made with a clean design that is free of obtrusive mechanical features and other primarily functional elements. For example, the vents here present streamlined horizontal openings that give a much different visual impression than the traditional vents that have significantly lower aspect ratios. As such, the vents may have no mechanical adjustment mechanisms visible on the instrument panel. Rather, the vents can be regulated using virtual controls.

Figure 3:
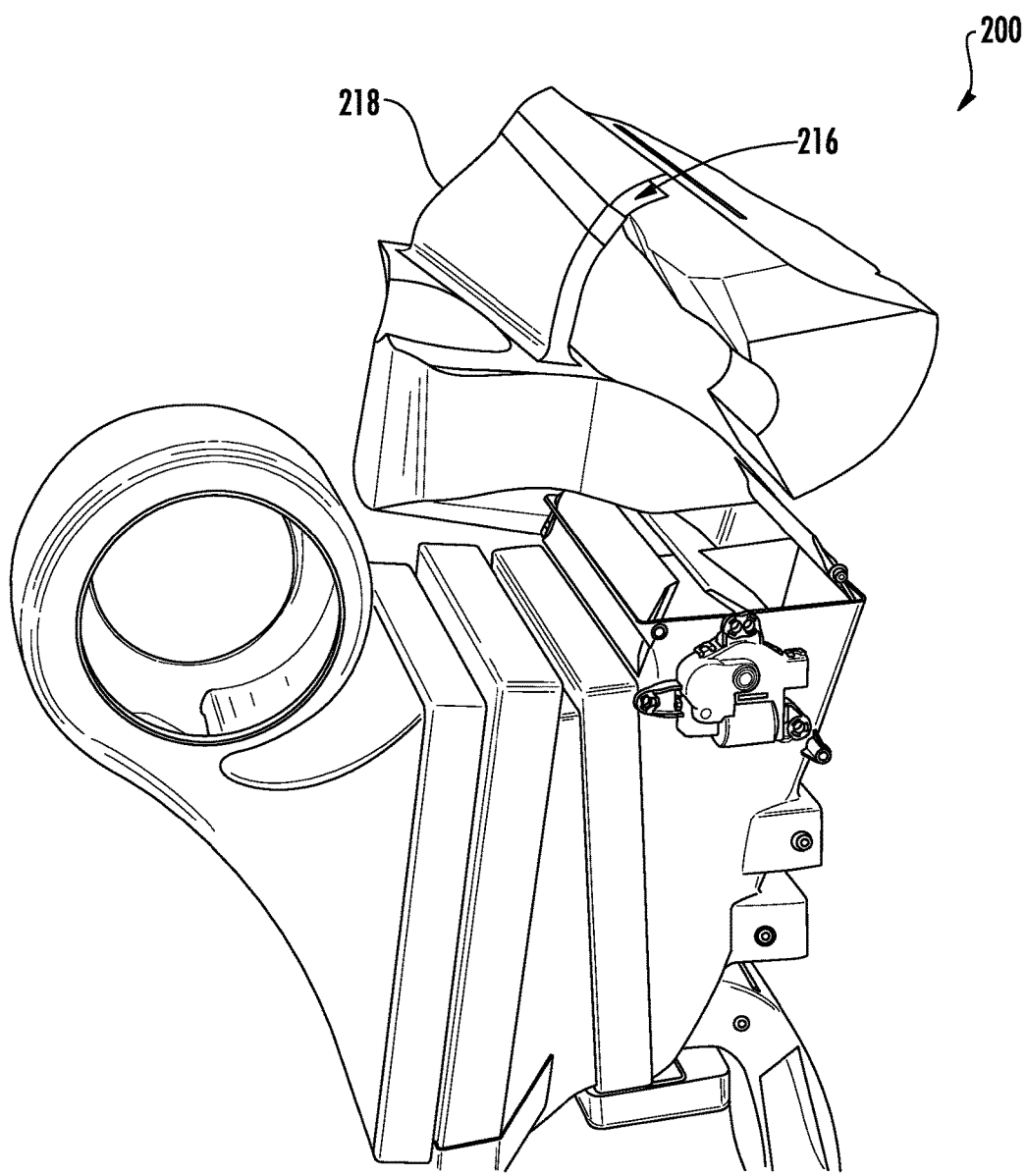
FIG. 3 shows another cross section of the thermal system in FIG. 2.

FIG. 3 shows another cross section of the thermal system 200 in FIG. 2. The illustration shows that the wave duct 218 can have a relatively flat configuration nearest the wave outlet 216. For example, this can be done to meet packaging constraints. Here, this end of the wave duct is somewhat curved, resulting in the vent being oriented essentially in a horizontal direction.

Figure 4:
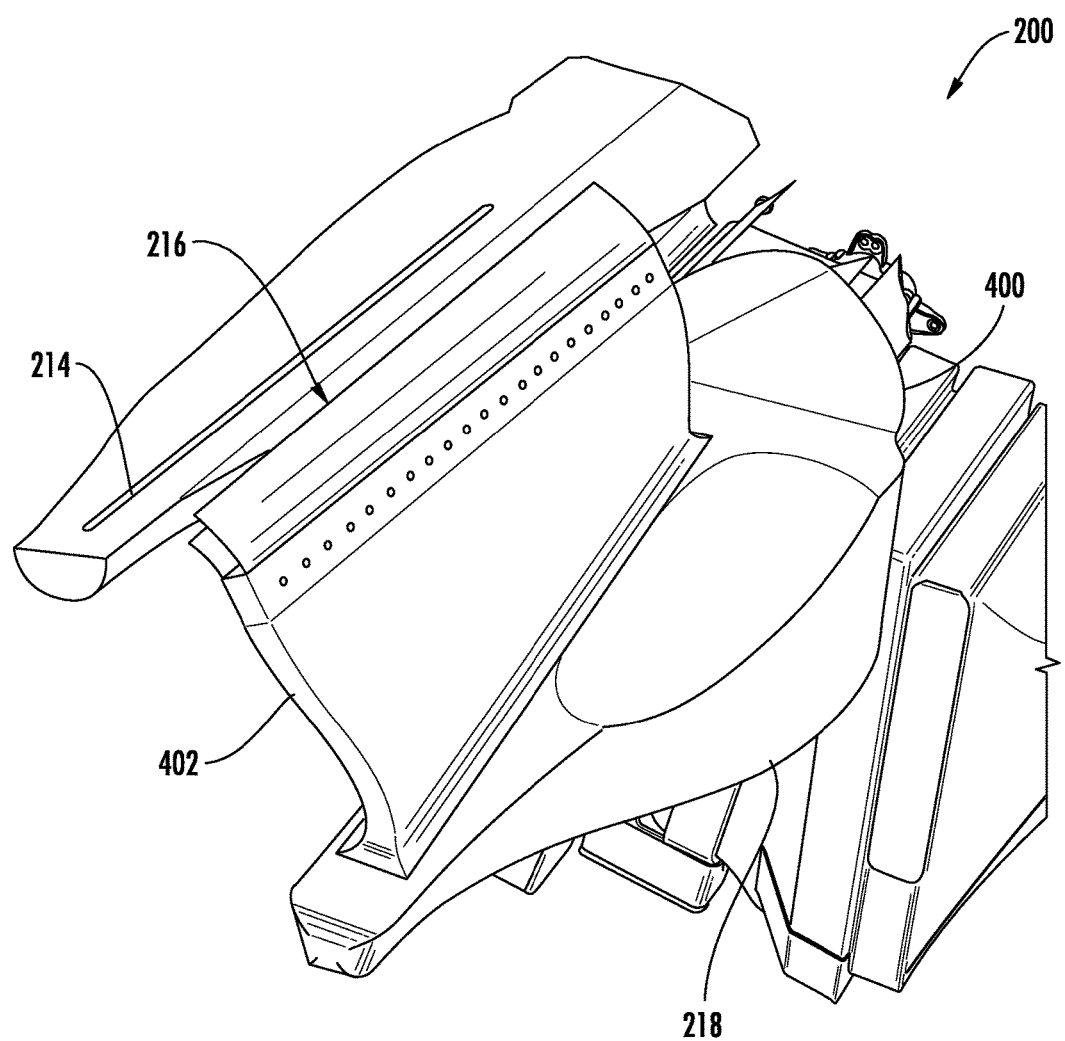
FIG. 4 shows another view of the thermal system in FIG. 2.

FIG. 4 shows another view of the thermal system 200 in FIG. 2. This illustration shows the wave outlet 216 and the bleed outlet 214 somewhat from above so as to present more of the wave duct 218 into view. In particular, the wave duct here has a voluminous portion 400 nearest the HVAC unit, which portion then feeds into a narrower wave duct 402 that leads to the wave outlet. For example, this can improve the characteristics of the air flow into the main vent.

Figure 5:
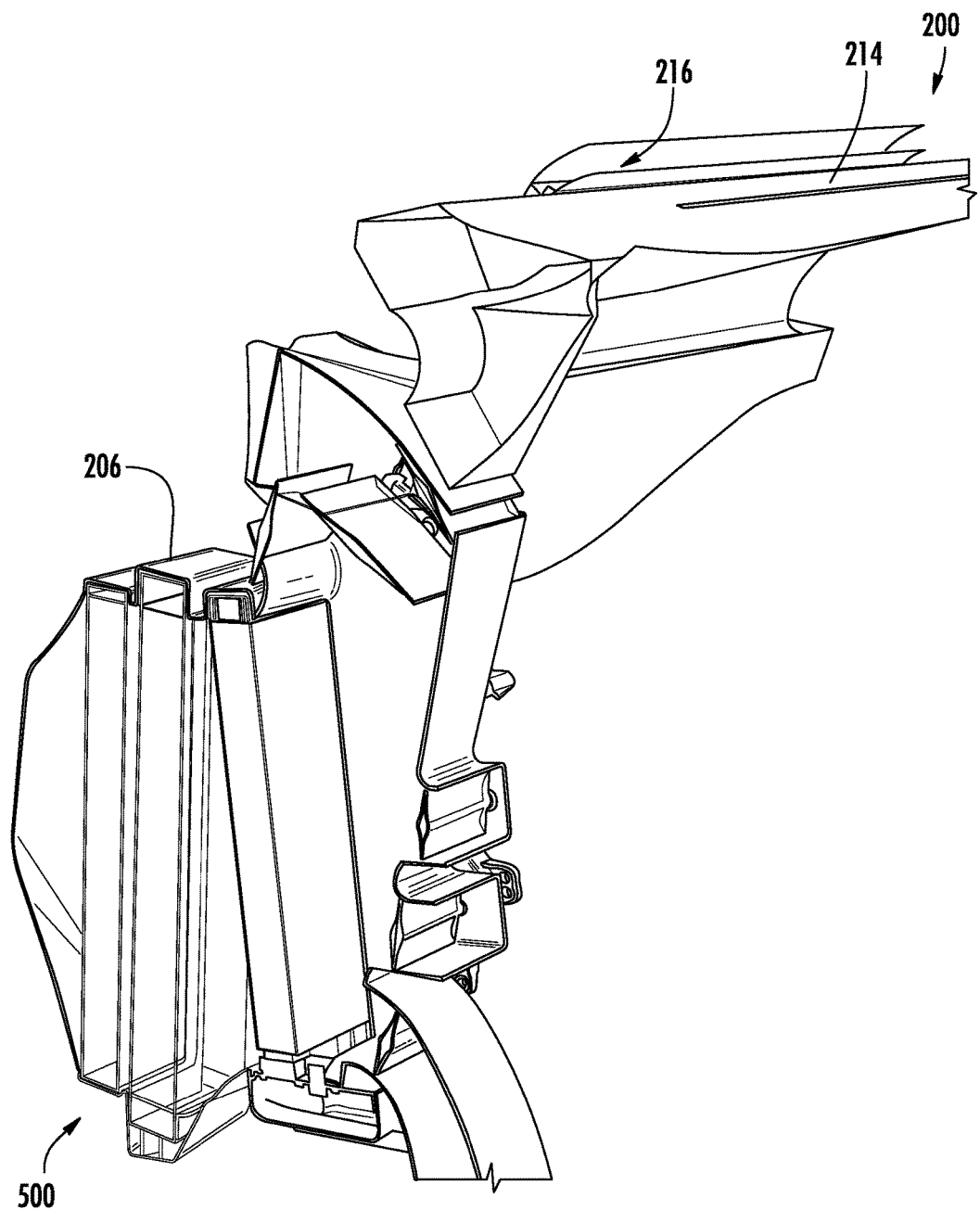
FIG. 5 shows another cross section of the thermal system in FIG. 2.

FIG. 5 shows another cross section of the thermal system 200 in FIG. 2. This illustration shows the wave outlet 216 and the bleed outlet 214 more from the side so as to present more of the HVAC unit 206. In particular, the HVAC unit can include a filter section 500 that can facilitate filtering of one or more air streams. For example, a fresh-air filter (e.g., a HEPA filter) can be applied to air that is drawn from an inlet of the HVAC unit (e.g., from outside the vehicle) before that air is supplied into the duct(s) for the passenger compartment. As another example, a recirculation air filter can be applied to air that the HVAC system draws from the cabin before re-supplying that air into the cabin again.

Figure 6:
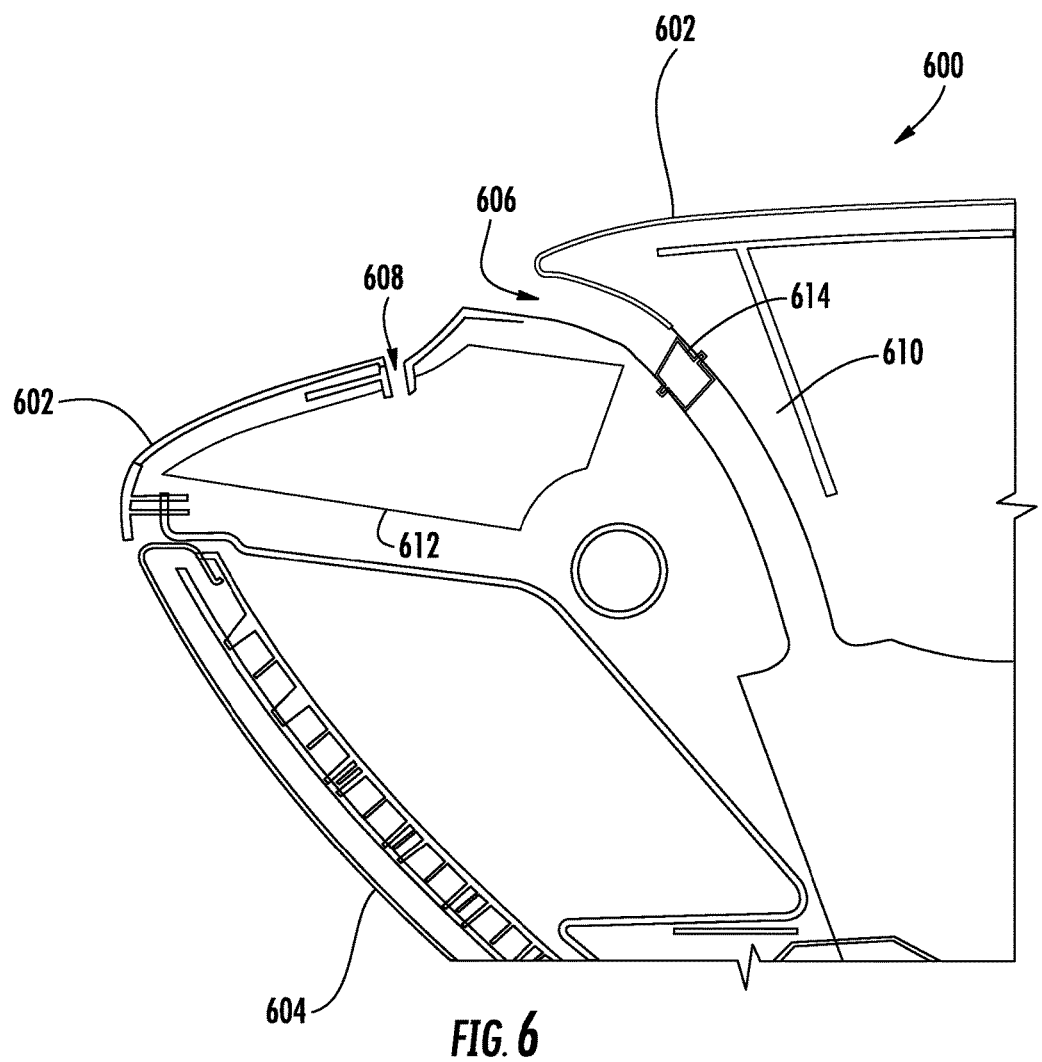
FIG. 6 shows a cross section of another example of a thermal system.

FIG. 6 shows a cross section of another example of a thermal system 600. The system includes an instrument panel 602, a glove compartment door 604, a vent 606 that is non-flush with regard to the instrument panel, another vent 608 in the instrument panel, a duct 610 leading to the vent 606, a duct 612 leading to the vent 608, and a vane 614 in the duct 612 for controlling the flow of air through the vent 606. As such, the vent 606 can receive air supplied from an HVAC unit (not shown) and as a result generate a first plane of air that emanates from the instrument panel 602. The vent 608, moreover, can also be supplied with air (e.g., from the same HVAC unit) and can generate a second plane of air that intersects the first plane.

Figure 7:
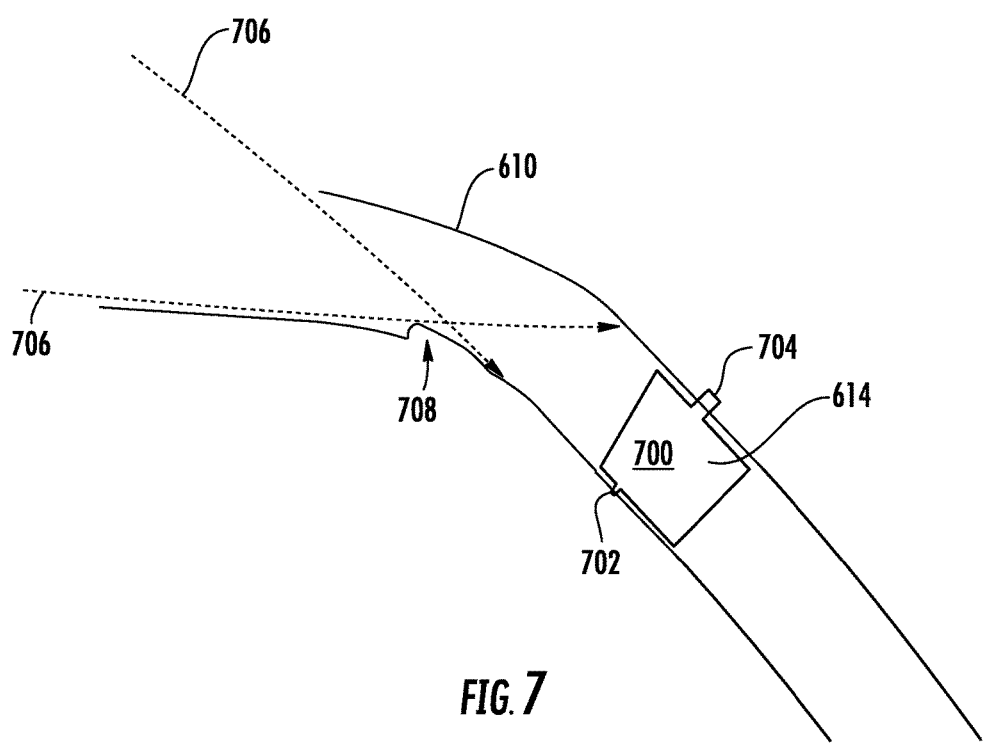
FIG. 7 shows an example of the duct with the vane from FIG. 6.

FIG. 7 shows an example of the duct 610 with the vane 614 from FIG. 6. Here, the vane includes a body 700 (e.g., a relatively flat member) that is pivotable about at least one point 702. A control shaft 704 can be used to set the vane in a particular direction relative to the duct. For example, the control shaft can be actuated using a motor that is controlled directly by a user, or indirectly by the vehicle's control system. One or more vanes can be used in the same duct, such as side-by-side with each other.

The duct 610 is curved. For example, this can accommodate a particular orientation of the vent relative to the instrument panel and/or can accommodate a desirable placement of the rest of the ductwork and the HVAC unit relative to the vehicle interior. As another example, the curvature can facilitate an aesthetic appearance to the vent such that the vane and other functional elements are not immediately visible. For example, lines-of-sight 706 are here indicated, corresponding to the extreme angles from which a person can look into the duct. In some implementations, the curved duct and the vane are arranged so that the vane is away from the lines-of-sight.

A step 708 is here provided inside the duct 610. For example, this can prevent that liquids, debris or other objects accidentally fall into the vent and its duct. The step can have any suitable shape and can be formed from the material of the duct, or as a separate piece.

Figure 8:
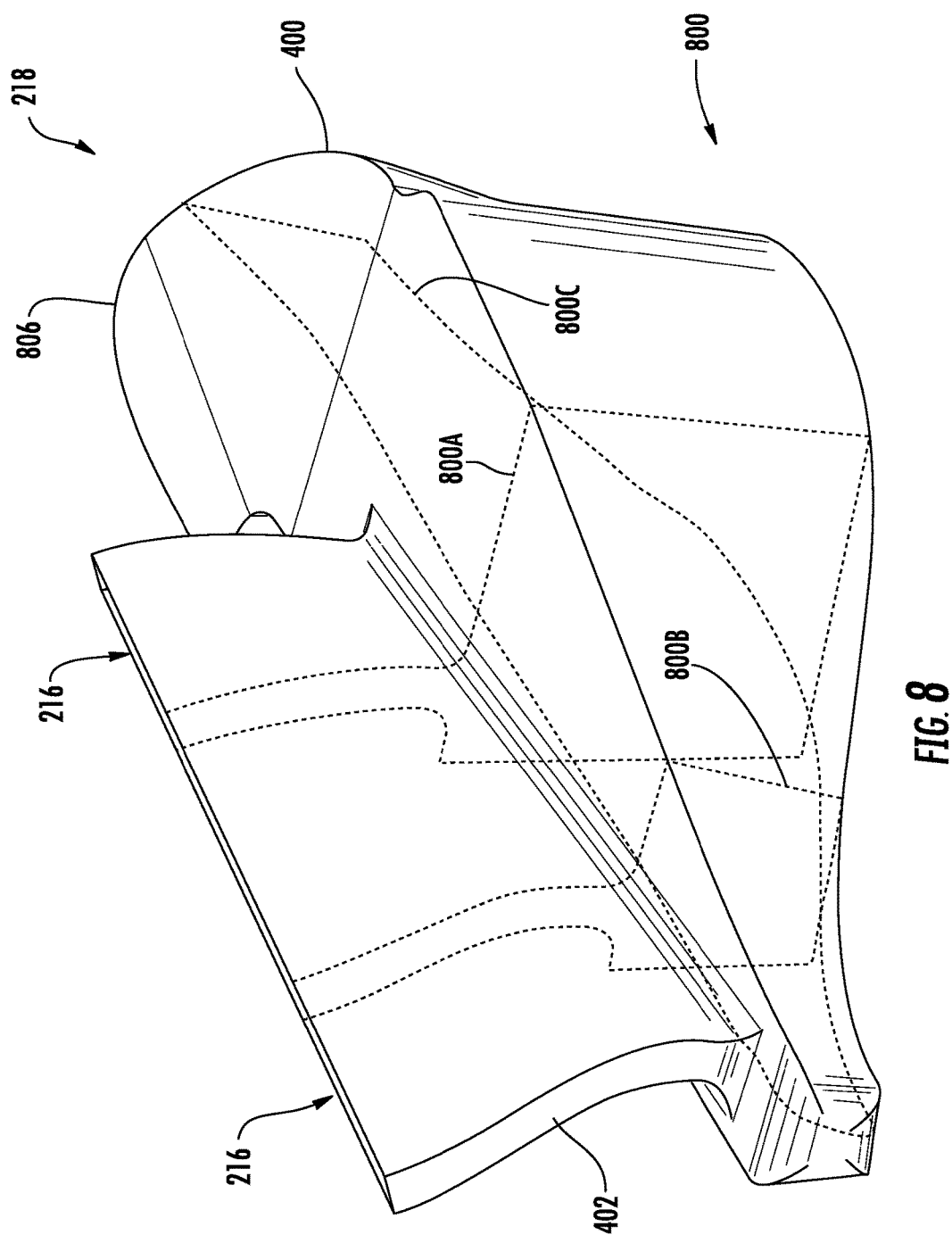
FIG. 8 schematically shows the duct for the vent of the thermal system in FIG. 2.

FIG. 8 schematically shows the duct 218 for the vent 216 of the thermal system in FIG. 2. The duct here includes the voluminous portion 400 and the narrower wave duct 402. The voluminous portion 400 can be the one placed nearer the HVAC unit of these two components, whereas the narrower wave duct 402 can feed air from inside the portion 400 toward the vent 216.

As indicated, the interior of the voluminous portion 400 is hollow so as to accommodate a volume of air. Here, the interior shape of the portion 400 is schematically represented by profile lines 800. In particular, profile lines 800A and 800B indicate the transverse size and shape of the large duct, and how it feeds into the narrower wave duct 402. A profile line 800C, moreover, indicates the longitudinal size and shape of the larger duct from one end (e.g., near the HVAC unit) to the other (e.g., farthest from the HVAC unit).

Figure 9:
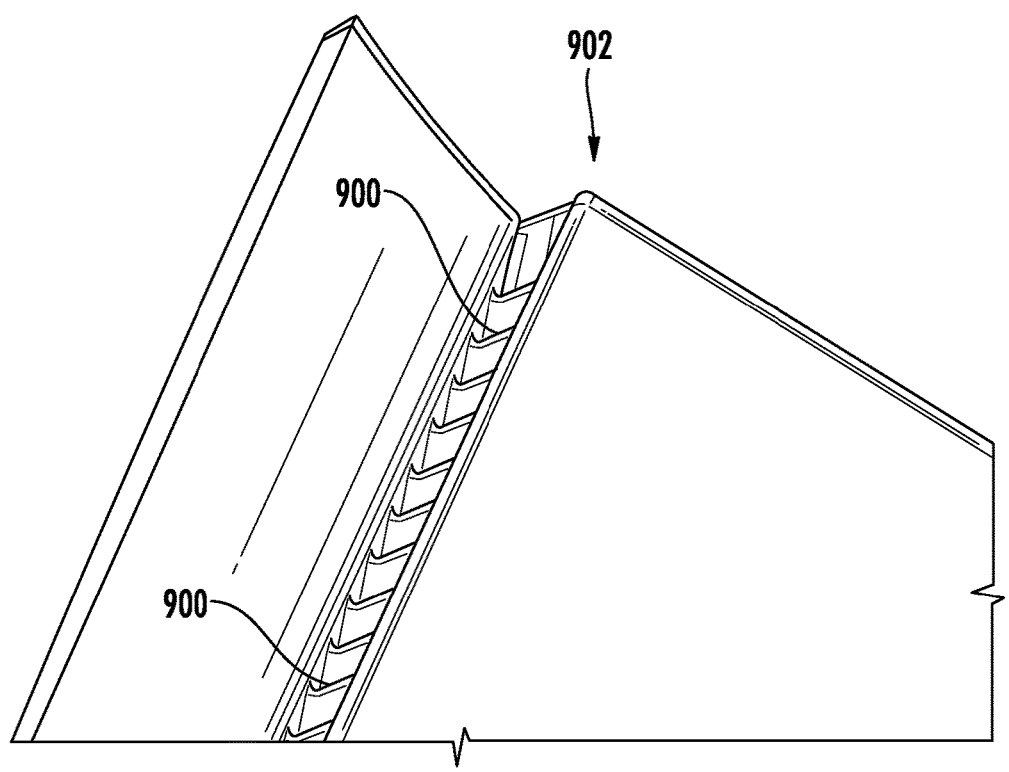
FIG. 9 shows an example of ribs on a vent.

FIG. 9 shows an example of ribs 900 on a vent 902. In some implementations, the vent can be considered the secondary vent in regard to a main vent (not shown), such that the vent 902 is configured to provide a plane of air that affects the direction and flow of the plane of air generated by the main vent. For example, the vent 902 can be located on an instrument panel of a vehicle, such as in a position below and parallel to, the main vent. The ribs can prevent that debris or other objects accidentally fall into the vent and its duct.

The secondary vent can have any suitable shape. In some implementations, the secondary vent can include a mesh-covered opening that extends over part or all of an interior surface in the vehicle.

Figure 10:
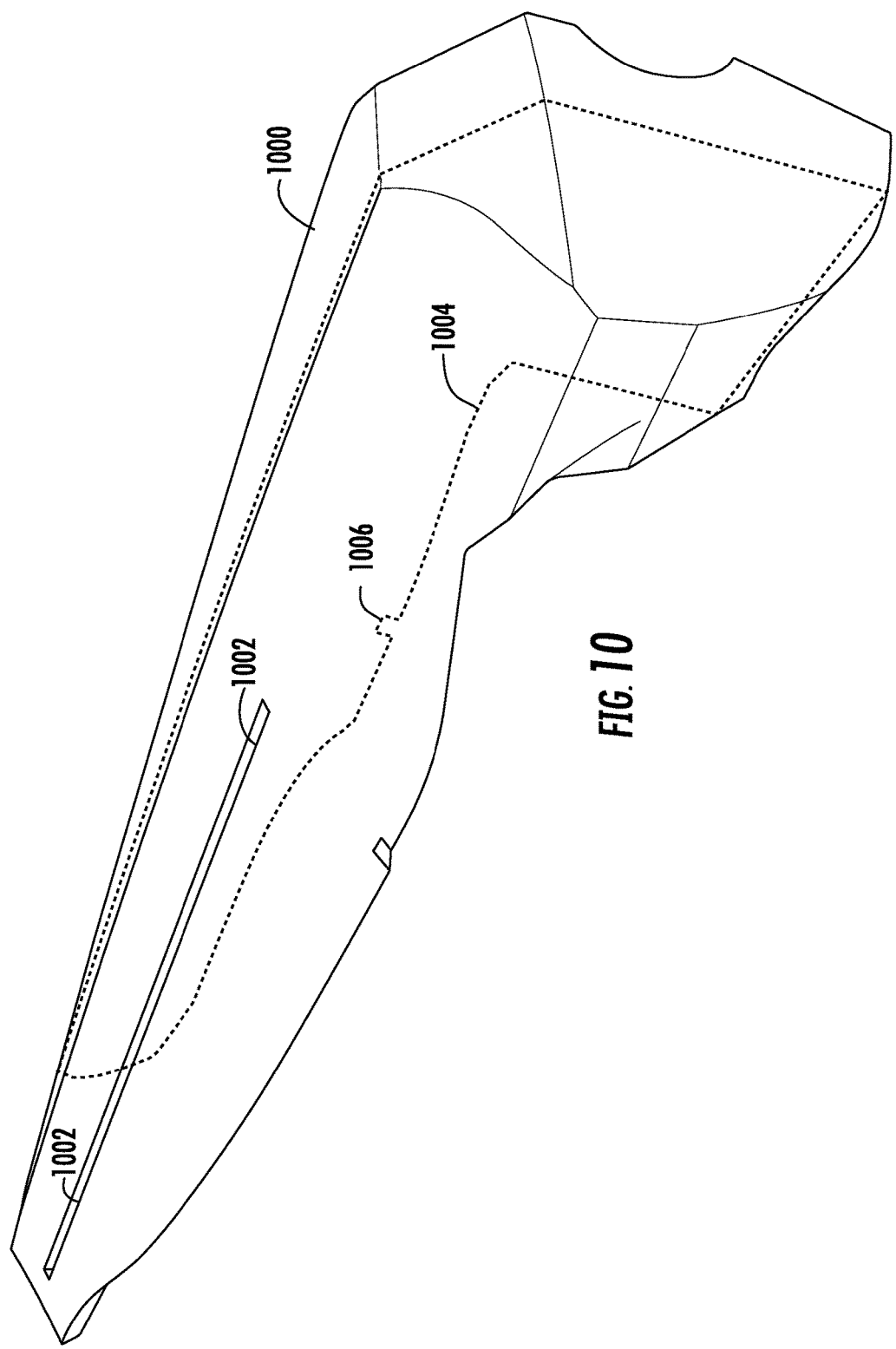
FIG. 10 shows an example of a step within a duct.

FIG. 10 shows an example of a step within a duct 1000. Here, the duct leads to a vent 1002. For example, in an instrument panel where a main vent generates a plane of air, the vent 1002 can serve as a secondary vent that guides the main plane of air. The inside of the duct is at least partially hollow and forms a plenum inward of the vent 1002. The interior shape of the duct is here schematically indicated by a profile line 1004. The hollow interior can have at least one step 1006. In some implementations, when items or liquid enter the duct through the vent, the step can prevent it or them from passing further into the thermal system. For example, if the items were to pass all the way into the HVAC unit this would require a more complex service procedure. The step can have any suitable shape and can be formed from the material of the duct, or as a separate piece. In some implementations, the ribs 900 (FIG. 9) are provided on the vent 1002.

Figure 11:
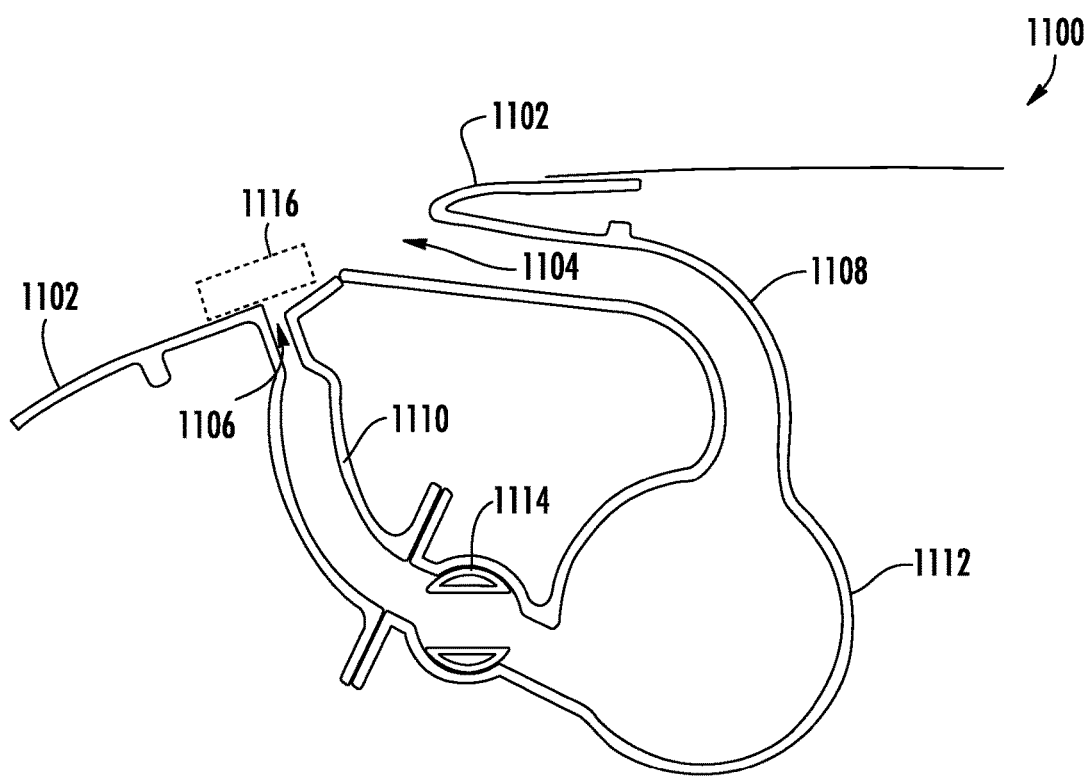
FIG. 11 shows a cross section of another example of a thermal system.

FIG. 11 shows a cross section of another example of a thermal system 1100. The system includes an instrument panel 1102, a vent 1104 that is non-flush with regard to the instrument panel, another vent 1106 in the instrument panel, a duct 1108 leading to the vent 1104, a duct 1110 leading to the vent 1106, and a common duct 1112. A valve 1114 is here positioned in the duct 1110. As such, the vent 1104 can receive air supplied from an HVAC unit (not shown) and as a result generate a first plane of air that emanates from the instrument panel 1102. The vent 1106, moreover, can also be supplied air (e.g., from the same HVAC unit) and can generate a second plane of air that intersects the first plane.

In examples above, it has been mentioned that when a high aspect ratio vent is non-flush with the instrument panel it can tend to stick to the surface thereof under certain circumstances. A region 1116, which is here schematically illustrated as a rectangle, is generated by the air stream. Such a region, which occurs in this implementation and the other examples described herein, can be considered a reduced air pressure zone at or near the instrument panel and can cause the above situation of sticking. The vent 1106, moreover, can be positioned so that it feeds into this zone of lower air pressure. This can tend to reduce the sticking of the main air stream to the surface and therefore facilitate a more effective directional control thereof. Accordingly, this is one mechanism by which the vent 1106 or corresponding structures can provide a useful advantage. In a sense, the bleed vent can then be placed before the point where the main jet stream would attach to the surface of the instrument panel, to prevent or reduce the occurrence of this.

Another mechanism by which the vent 1106 can provide a useful advantage is by way of collision between the respective planes of air (e.g., from the vents 1104 and 1106), which can allow the secondary jet to push the primary jet toward a desired direction, for example so that it becomes aimed at an occupant, or a particular place on that occupant's body. In a sense, the bleed vent can then be placed after the point where the main jet stream attaches to the surface of the instrument panel, to facilitate a de-attachment therefrom.

The duct 1110 for the vent 1106 is here shown as having a separate piece downstream of the valve 1114. For example, this can facilitate substitution of a different piece to relocate the secondary vent, such as to obtain a different instrument panel configuration, for example with a different type/model of vehicle.

Figure 12:
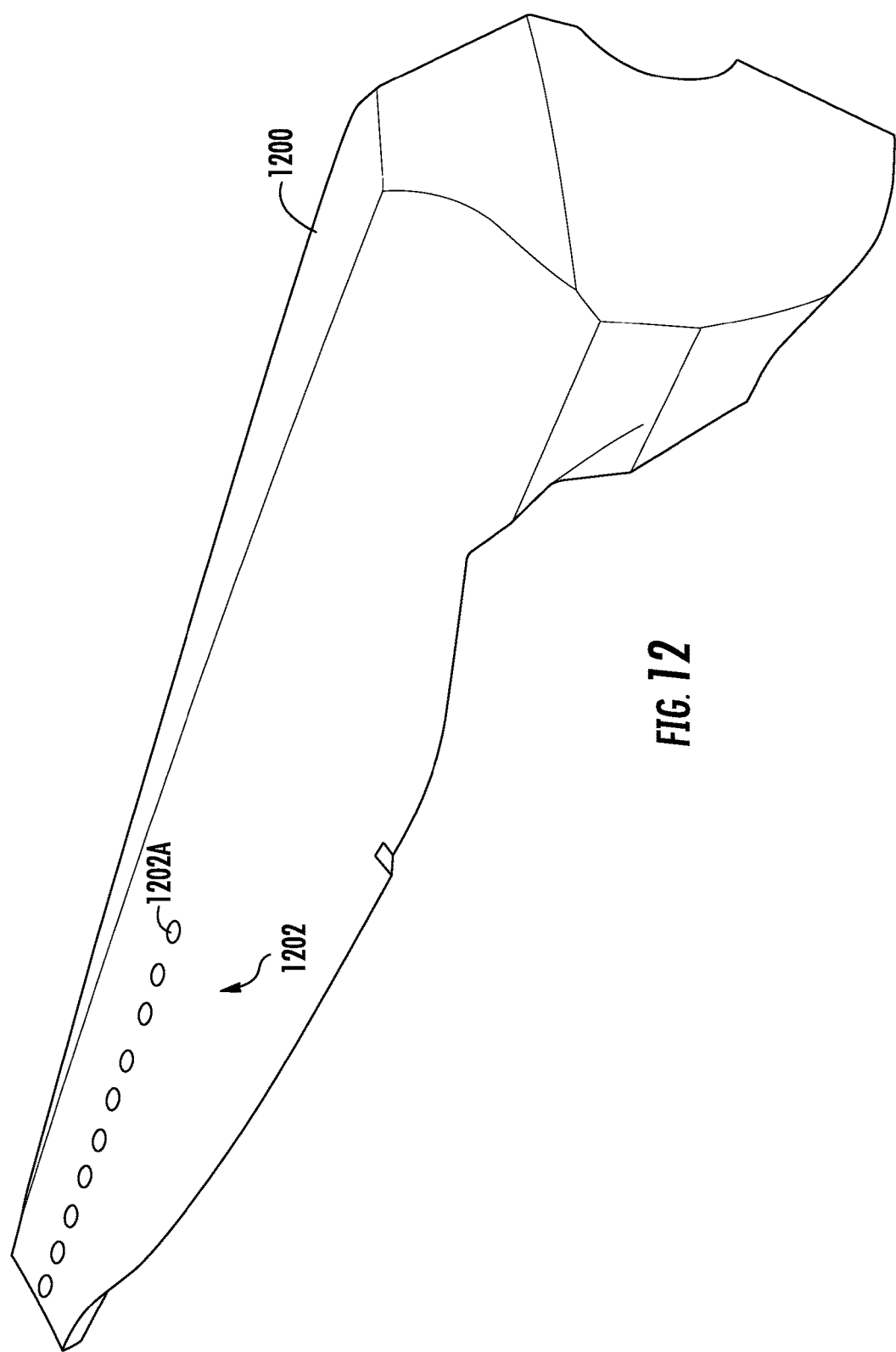
FIG. 12 shows another example of a duct with a secondary vent.

FIG. 12 shows another example of duct 1200 with a secondary vent 1202. For example, the secondary vent 1200 can serve to guide a plane of air generated by a main duct in an instrument panel. The secondary vent can do so by generating a plane of air that intersects with the jet stream from the main vent. The secondary vent 1202 here includes a number of vent outlets 1202A. In this example, each individual vent outlets does not have a high aspect ratio. Rather, the grouping of multiple vent outlets within the secondary vent 1202 effectively gives this vent a high aspect ratio. These vent outlets are essentially circular but can have a different shape in another implementation, including, but not limited to, square.

It was mentioned earlier that one or more high aspect ratio vents can be used in an instrument panel, among other places of a vehicle. Moreover, some examples above (e.g., FIG. 2) have illustrated vents directed primarily toward a right side seat in the first row (which is the passenger seat in certain countries, such as the US). However, vents can also or instead be provided for the seat on the opposite side. In some implementations, a similar or identical set of vents are provided for each seat in the first row. For example, the driver side can have one main vent with one or more secondary vents, and the passenger side can have one main vent with one or more secondary vents. A central interruption between the sets of vents can then accommodate other structure in the instrument panel, including, but not limited to, a touchscreen control panel.

A number of implementations have been described as examples. Nevertheless, other implementations are covered by the following claims.

What is claimed is:

1. A thermal system with high aspect ratio vents for a vehicle, the thermal system comprising:
    a heating, ventilation and air conditioning (HVAC) unit disposed in the vehicle;
    a first high aspect ratio vent operably coupled to the HVAC unit and configured to receive air supplied by the HVAC unit and produce therefrom a first plane of air in a passenger compartment of the vehicle, the first high aspect ratio vent oriented in an essentially horizontal direction and positioned in a panel of the vehicle facing the passenger compartment; and
    a second high aspect ratio vent operably coupled to the HVAC unit and configured to receive air supplied by the HVAC unit and produce therefrom a second plane of air in the passenger compartment, the second high aspect ratio vent positioned in the panel below the first high aspect ratio vent and oriented upward such that the second plane of air intersects the first plane of air within the passenger compartment.

2. The thermal system of claim 1, wherein the first high aspect ratio vent has a first high aspect ratio in which a first dimension is at least eight times greater than a second dimension and the second high aspect ratio vent has a second high aspect ratio in which a first dimension is at least eight times greater than a second dimension, and wherein the first high aspect ratio is different from the second high aspect ratio.

3. The thermal system of claim 1, wherein the second high aspect ratio vent includes multiple vent outlets, and wherein each of the vent outlets is shorter than the first high aspect ratio vent.

4. The thermal system of claim 1, further comprising a common duct supplying air from the HVAC unit, a first duct leading from the common duct to the first high aspect ratio vent, a second duct leading from the common duct to the second high aspect ratio vent, and a valve positioned in the second duct.

5. The thermal system of claim 1, further comprising a curved duct leading to the first high aspect ratio vent for supplying air from the HVAC unit to the first high aspect ratio vent, and a vane positioned in the curved duct away from a line of sight entering the curved duct from the passenger compartment.

6. The thermal system of claim 1, further comprising a duct leading to the first high aspect ratio vent for supplying air from the HVAC unit to the first high aspect ratio vent, and a step inside the duct that faces toward the passenger compartment.

7. The thermal system of claim 1, further comprising one or more ribs partially covering an opening of the second high aspect ratio vent.

8. The thermal system of claim 1, wherein the panel is an instrument panel of the vehicle.

9. The thermal system of claim 8, wherein the instrument panel comprises a first structural portion on a long side of the first high aspect ratio vent, and a second structural portion on an opposite side of the long side, wherein an angle between the first structural portion and the first plane of air is greater than an angle between the second structural portion and the first plane of air, and wherein the second high aspect ratio vent is positioned in the second structural portion.

10. The thermal system of claim 9, wherein the first plane of air forms, at the second structural portion, a reduced air pressure zone with respect to the immediately surrounding areas of the passenger compartment, and wherein the second high aspect ratio vent is positioned in the second structural portion so that the second plane of air feeds into the reduced air pressure zone.

11. The thermal system of claim 9, wherein the second high aspect ratio vent is positioned in the second structural portion so that the second plane of air directs the first plane of air away from the second structural portion.

12. The thermal system of claim 8, further comprising at least one adjustment mechanism configured to adjust at least one of the first plane of air or the second plane of air in response to control signals generated via one or more virtual controls presented on a touchscreen of the vehicle, wherein the at least one adjustment mechanism includes one or more of a vane or a valve.

13. A thermal system for a vehicle, the thermal system comprising:
    a heating, ventilation and air conditioning (HVAC) unit disposed in the vehicle;
    a first high aspect ratio vent coupled to the HVAC unit and configured to receive air supplied by the HVAC unit and produce therefrom a first plane of air in a passenger compartment of the vehicle, wherein the first high aspect ratio vent is mounted in an instrument panel of the vehicle and oriented so that the first plane of air is essentially horizontal; and
    a second high aspect ratio vent coupled to the HVAC unit and configured to receive air supplied by the HVAC unit and produce therefrom a second plane of air in the passenger compartment, the second high aspect ratio vent mounted in the instrument panel of the vehicle below the first high aspect ratio vent, wherein the second high aspect ratio vent is oriented upward so that the second plane of air intersects the first plane of air.

14. The thermal system of claim 13, wherein the second high aspect ratio vent includes multiple vent outlets, and wherein each of the vent outlets is shorter than the first high aspect ratio vent.

15. A method comprising:
providing a supply of air using a heating, ventilation and air conditioning (HVAC) unit of a vehicle;
generating, via a first high aspect ratio vent, a first plane of air into a passenger compartment of the vehicle from the supply of air; and
generating, via a second high aspect ratio vent, a second plane of air into the passenger compartment from the supply of air, each of the first high aspect ratio vent and the second high aspect ratio vent having one side that is at least eight times longer than a different side, wherein the first high aspect ratio vent is positioned in an instrument panel of the vehicle and oriented in an essentially horizontal direction, and wherein the second high aspect ratio vent is positioned in the instrument panel below the first high aspect ratio vent and oriented upward such that the second plane of air intersects the first plane of air.

16. The method of claim 15, further comprising controlling a direction of the first plane of air in the passenger compartment by regulating an amount of air flow of the second plane of air.

* * * * *